Aug. 20, 1957  J. KIRKBRIDE  2,803,483
PANCAKE TURNER
Filed April 7, 1954
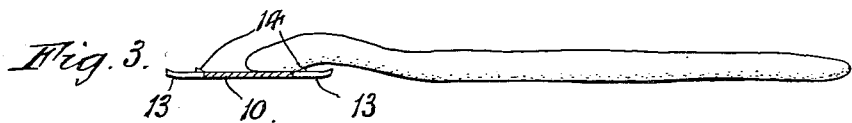
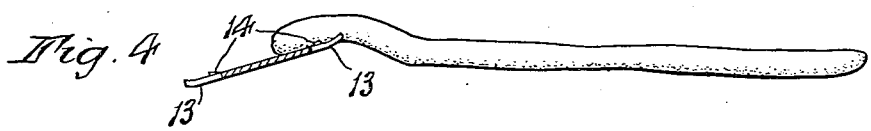
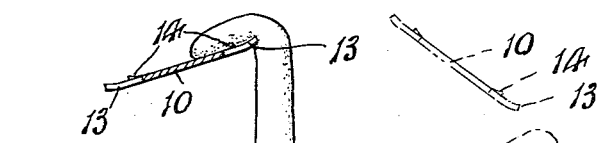
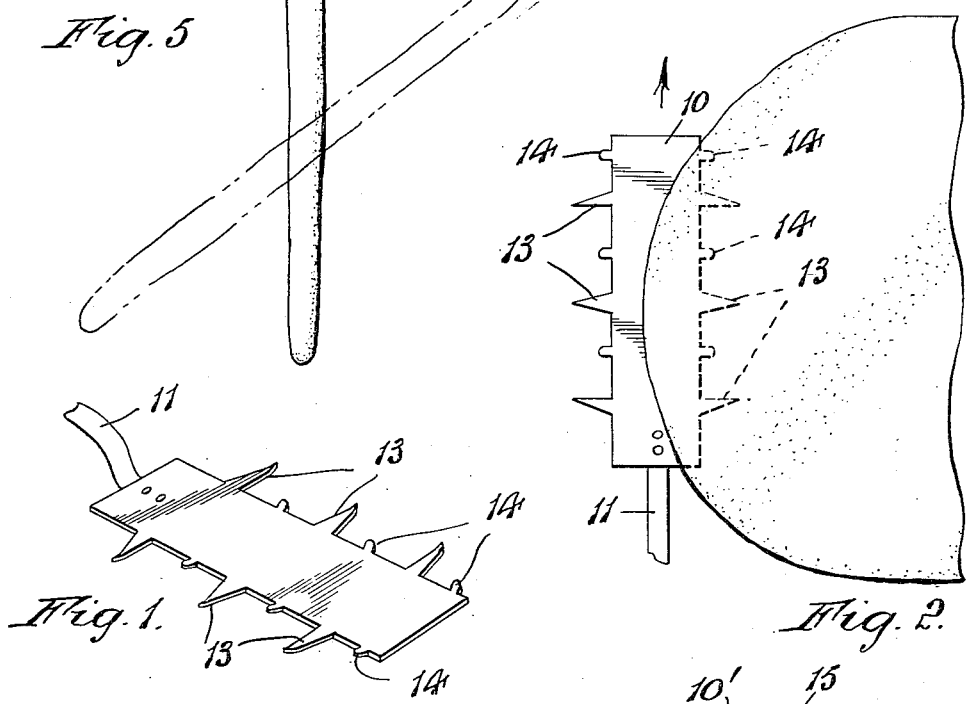
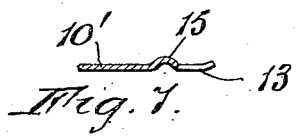
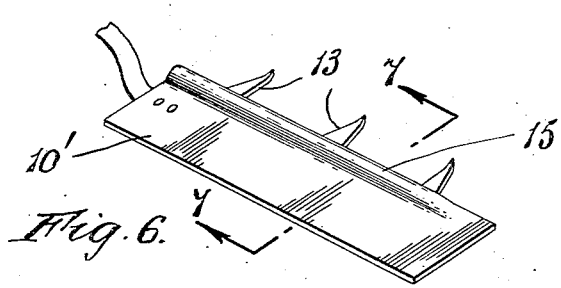
INVENTOR.
John Kirkbride.
BY Stanley Lightfoot
Attorney

United States Patent Office 2,803,483
Patented Aug. 20, 1957

2,803,483

PANCAKE TURNER

John Kirkbride, Detroit, Mich.

Application April 7, 1954, Serial No. 421,645

4 Claims. (Cl. 294—7)

This invention relates to an improved type of turner, and more particularly to the blade thereof, for the purpose of inverting flat articles of food, such as pancakes, meat or fried eggs, during the process of cooking.

My improved device calls for a somewhat different technique in its application and operation in effecting the inverting of the food article, as will become apparent hereinafter from the explanation of its use.

The invention is characterized by the turner blade being of thin material, such as is usual with such utensils, and having one or both of the longer edges provided with a series of spaced and slightly upturned pointed projections in combination with means adjacent the bases of said projections of a raised nature to perform merely an initial lifting function on the underside marginal portion of a pancake or food article whereby to permit the said projections to pass therebeneath when the said blade is moved in a lengthwise direction beneath such food article. Thus, by simply slightly rolling the turner blade slightly about the outer edge thereof (as related to the food article) the pointed projections are caused to engage thereunder so that, by then simply raising the turner blade upwardly with the said blade maintained substantially level, the article may be readily flipped over.

Still further objects or advantages additional or subsidiary to the aforesaid objects, or resulting from the construction or operation of the invention as it may be carried into effect, will become apparent as the said invention is hereinafter further disclosed.

In carrying the said invention into effect, I may adopt the novel construction and arrangement of parts hereinafter described, by way of example, having reference to the accompanying drawings, wherein:

Figure 1 is a perspective view of the blade of my improved turner;

Figure 2 is a plan view of the same illustrating the way in which one edge thereof is inserted lengthwise beneath the marginal portion of a food article;

Figures 3, 4 and 5 illustrate progressive movements imparted to the turner blade in the process of inverting such a food article, the blade being shown in transverse section;

Figure 6 is a similar view to Figure 1 of a modified form of the turner blade maintaining the same functional characteristics; and Figure 7 is a detail transverse section of such modified blade.

10 indicates a turner blade, preferably of thin flexible stainless steel, having attached to one end thereof the handle 11 which I prefer to incline at an angle of approximately 45 degrees to the plane of the blade, as illustrated. A convenient size for this blade is about 4″ in length and about 1¼″ wide for most purposes.

In the first example, Figures 1 to 5, the longer edges of the blade are shown as being provided with a series of pointed projections 13 extending laterally therefrom and spaced apart from one another at intervals of, say, one inch and shown as projecting approximately one quarter of an inch from the blade. These projections have their tips bent upwardly, such as to an extent of one thirty-second of an inch, above the general plane of the blade.

A series of blunt projections or lugs 14 are also shown as also projecting from the edges of the blade and alternating with the pointed projections 13; and these lugs have their tips similarly bent upwardly to an extent approximating that to which the tips of the said pointed projections 13 are bent. At least one of these blunt projections or lugs 14 is positioned closer to the outer end of said blade than any of the pointed projections 13.

The operation of the said blunt projections or lugs 14 is such that, if one edge of the blade be inserted lengthwise (as indicated by the arrow in Figure 2) beneath the marginal portion of the article of food to be turned, these lugs 14 will perform an initial localized lifting function and raise such portion sufficiently to permit the sharp projections 13 to freely pass under such marginal portion of the food until several of such projections are overlapped by the food.

After the turner blade has been moved to such a position it may be then tilted slightly (using the opposite edge of the blade as a fulcrum as shown in Figure 4) thereby causing the sharp projections 13 to engage the underside of the marginal portion of the food with the result that the article of food may be thereafter further lifted by the simple raising of the turner blade as a whole, and in a substantially level position, to an extent causing the article of food to become more or less suspended downwardly from the said pointed projections. From this pendant position the food article may be readily flipped over by simply moving the turner blade laterally as shown in Figure 5. In other words the pancake or other article is simply raised by one edge in engagement of the pointed projections and swung beneath the blade to an inverted position, whereupon it is readily disengaged therefrom.

While the turner blade as described with reference to Figures 1 to 5 is shown as having the pointed projections 13 extending from both of the longitudinal edges thereof (more particularly to accommodate it to use by either right or left handed persons), it will be obvious that such projections may be confined to just one edge of the blade such as in the manner shown in Figures 6 and 7.

It will also be obvious that other means may be substituted for the blunt projections or lugs 14 to accomplish a similar initial lifting function on the underside marginal portion of the food article, and, in the said arrangement Figures 6 and 7, the modified blade 10 is shown as being simply provided with an upwardly rising rib 15 extending lengthwise of the said blade 10′ at the bases of the pointed projections 13 for that purpose. The forward extremity of this rib may be tapered off to the general plane of the said blade 10′, as shown, to facilitate its passage beneath the under surface of the food article in the manner described.

The improved turner has been found, in practice, to be quite efficient and dependable in performing the food-turning operation even in the hands of quite inexperienced operators once the characteristic method of its use is understood. Herein, and in the claims, the term "outer end" is intended to refer to that end of the blade which is remote from the handle.

This invention may be developed within the scope of the following claims without departing from the essential features of the said invention, and it is desired that the specification and drawing be read as being merely illustrative of a practical embodiment of the same and not in strictly limiting sense.

What I claim is:

1. A turner for endwise insertion beneath a pancake, comprising a narrow elongated blade having a handle at one end thereof, lateral pointed projections integral with and extending laterally of said blade, the points of said projections being turned upwardly of the plane of said blade, the marginal portion of said blade adjacent the bases of said pointed projections being also raised upwardly of the plane of said blade to at least as great an extent as do the points of said projections, the raised portion of the margin of said blade extending closer to the outer end of said turner than any of said pointed projections, whereby to initially lift the pancake when the turner is inserted endwise therebeneath.

2. A turner for endwise insertion beneath a pancake, comprising a narrow elongated blade having a handle at one end thereof, said blade having a lateral working edge from which a series of spaced pointed projections extend laterally and upwardly, and a plurality of blunt projections integral with said working edge extending upwardly of said blade to at least as great an extent as said pointed projections, at least one of said blunt projections being closer to the outer end of said blade than any of said pointed projections, whereby to initially lift the pancake when the turner is inserted endwise therebeneath.

3. A turner for endwise insertion beneath a pancake, comprising a blade of a narrow elongated form having a lateral working edge, a series of spaced projections extending from said edge substantially in the plane of said blade, said projections terminating in upwardly extending points, and blunt projections interposed between said pointed projections and extending upwardly to at least as great a distance as said pointed projections, at least one of said blunt projections being closer to the outer end of said blade than any of said pointed projections, whereby to initially lift the pancake when the turner is inserted endwise therebeneath.

4. A turner for endwise insertion beneath a pancake, comprising a blade of a narrow, flat elongated form having a lateral working edge and provided with a handle at one end thereof, a series of spaced projections extending from said edge substantially in the plane of said blade and terminating in upwardly extending points, and a rib formed on said blade adjacent said working edge and extending upwardly at least as high as the points of said projections and toward the outer end of said blade beyond said projections.

References Cited in the file of this patent
UNITED STATES PATENTS

| | | |
|---|---|---|
| 1,133,776 | Wirt | Mar. 30, 1915 |
| 1,196,526 | Dauner | Aug. 29, 1916 |
| 1,713,529 | Grant | May 21, 1929 |
| 1,723,507 | Haertter | Aug. 6, 1929 |
| 2,489,606 | Allen | Nov. 29, 1949 |
| 2,594,598 | Timmins | Apr. 29, 1952 |

FOREIGN PATENTS

| | | |
|---|---|---|
| 455,445 | Canada | Mar. 29, 1949 |